United States Patent Office 2,847,257
Patented Aug. 12, 1958

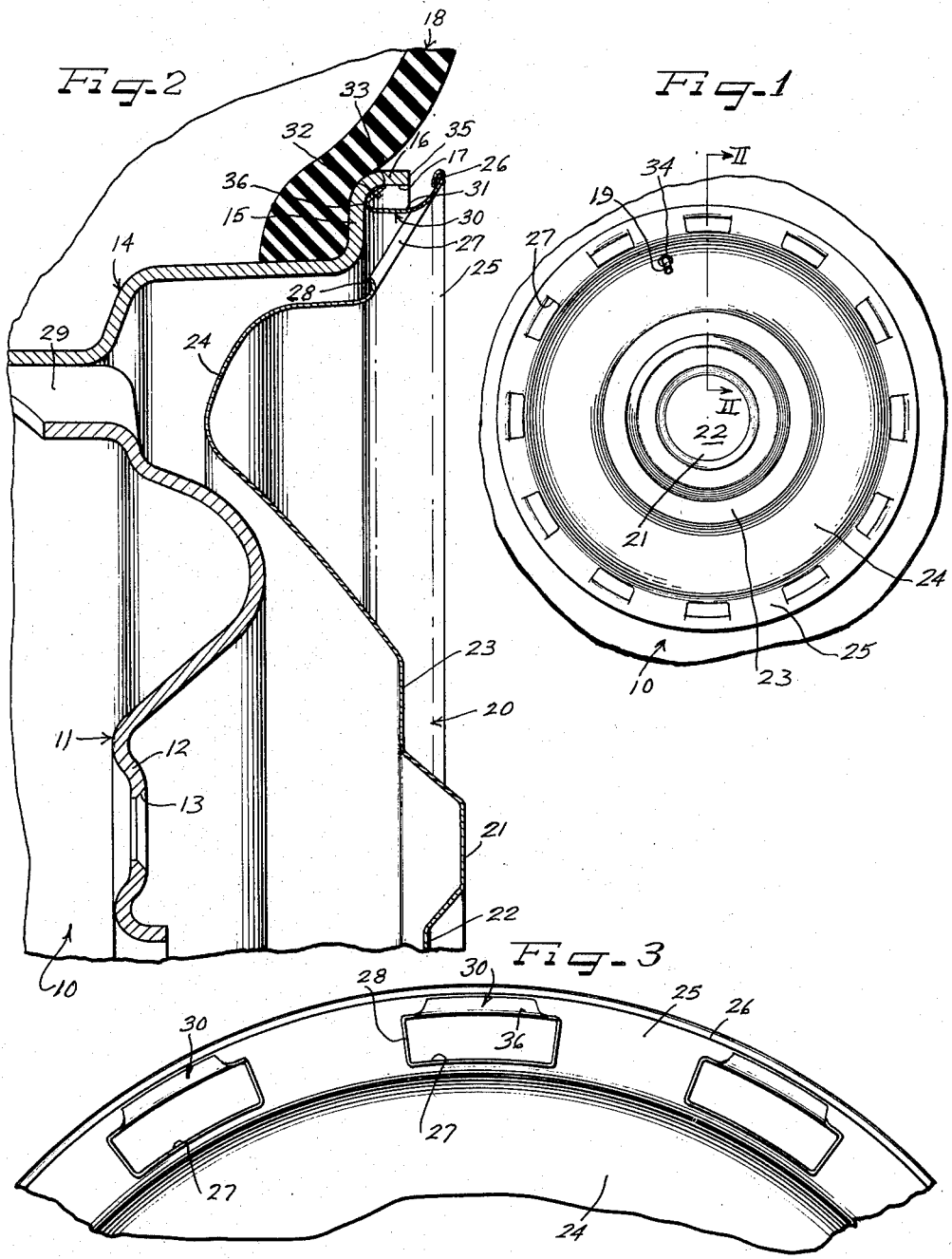

2,847,257

WHEEL COVER

George Albert Lyon, Detroit, Mich.

Application May 22, 1956, Serial No. 586,448

2 Claims. (Cl. 301—37)

The present invention relates generally to an ornamental wheel cover for overlying protective retained disposition upon a vehicle wheel.

In the automobile industry there is presently existent a demand for wheel cover manufacturers to reduce the cost of their product. To this end, an ornamental wheel cover has here been provided which may be stamped from a sheet metal blank of a relatively smaller overall dimension since the retaining means has been formed from cover material pressed out to provide circumferentially spaced cover openings. The cover openings are particularly positioned opposite the outer margin of the tire rim and adapted to cooperate with circumferentially spaced wheel openings on the wheel to promote circulation of air to cool the wheel structure.

Accordingly, an object of this invention is to provide a new and improved highly ornamental wheel cover member having new and improved means to maintain the same upon a vehicle wheel.

Still another object of this invention is to provide a wheel structure which is particularly constructed so as to promote circulation of air about the wheel to cool the same.

Still another object of this invention is to provide a wheel cover member which lends itself to economical manufacture on a large production basis and which is adapted to efficiently coact with a wheel in the maintenance of the cover member thereon.

According to the general features of this invention there is provided in a wheel structure, a wheel including circumferentially spaced wheel openings having a body part and a tire rim including an axially elongated terminal rim flange provided with a substantially flat inside surface, a cover member for overlying disposition upon the wheel including an outer margin provided with circumferentially spaced openings cooperable with the wheel openings to promote air circulation behind the cover member and with at least some of the openings having cover material cut only partially away providing resiliently deflectable cover-retaining extensions, the resiliently deflectable extensions emanating from the margin and extending generally axially rearwardly including an elongated axial leg portion and having a radially and axially outwardly extending short stiff terminal angled underlying said margin, the terminal terminating in an edge in gripping biting detachable snap-on pry-off cover-retained engagement with the substantially flat inside surface of the elongated terminal rim flange, the extensions having a portion bottomed against the wheel to back up the edge in its engagement with the axial terminal flange.

Other objects and features of the present invention will more fully become apparent in view of the following detailed description taken in conjunction with the accompanying drawing illustrating a single embodiment thereof and to which:

Figure 1 is a side elevation of my wheel structure having my cover member disposed on a vehicle wheel;

Figure 2 is an enlarged fragmentary cross-sectional view taken substantially on the line II—II of Figure 1 looking in the direction indicated by the arrow; and Figure 3 is an enlarged fragmentary rear elevation of my wheel cover.

As shown on the drawings:

The reference numeral 10 indicates generally my wheel structure including a body part 11 having a bolt-on flange 12 with apertures 13 therein which are adapted to receive lugs from an automobile axle or the like. After the lugs are inserted through the apertures 13, nuts may be threaded onto the lugs to clamp the wheel structure to the axle.

Suitably connected to the body part 11, by means such as welding, is a stepped multiflanged drop-center type tire rim 14 including a generally radially outwardly extending flange 15 and terminating in a generally axially outwardly elongated terminal flange 16 which is defined on its radially inner side by a substantially flat annular surface 17.

Carried upon the tire rim 14 is a conventional tire assembly 18 which may be either a tube or tubeless-type tire assembly. The tire assembly 18 is adapted to be inflated by means of valve stem 19 shown in Figure 1.

Overlying the rim and body parts is my novel wheel cover member 20 which is here illustrated as being of a circular full disk-type cover. The cover may be made from any suitable material, although it will be appreciated excellent results may be obtained by making the cover from spring steel of a stainless type since it is this type cover which particularly lends itself to being polished in an ornamental and lustrous manner.

The cover 20 includes a central crown 21 which has a depressed area 22 bounding its inner diameter. Bounding its radially outer diameter is an annular rib 23, the rib 23 constituting the radially inner boundary of intermediate dished cover portion 24. Disposed on the radially outer side of the dished portion 24 is cover margin 25 in overlying relation to the terminal rim flange 16. The margin 25 terminates in an underturned beaded extremity 26.

Disposed at circumferentially spaced intervals on the outer margin 25 are cover openings 27. Each of the openings 27 is bounded by a series of generally axially inwardly turned reinforcing edges 28. The openings 27 are adapted to cooperate with wheel openings 29, which are disposed between body and rim parts 11 and 14, to promote the circulation of air about the wheel structure to cool the same. Also, dirt may be dislodged from underneath the cover in the rotation of the wheel and fall out through the openings 27.

The material which is cut from the openings 27 to form the same has been here utilized to provide circumferentially spaced resiliently deflectable retaining extensions 30. It will be noted that each of the extensions 30 emanates from the cover margin 25 and has an axial resilient leg portion 31 extending generally axially rearwardly. To augment the resiliency of the extensions 30, the extension is preferably made wedge-shaped and the axial leg portion 31 is elongated relative to the short stiff terminal flange 32 which terminates in an edge 33 adapted for biting gripping engagement with surface 17 of terminal rim flange 16.

The cover may be assembled upon the wheel by aligning and inserting the valve stem 19 through cover opening 34 and upon the application of an axially inward force the edges 33 may be cammed over edge face 35 of the terminal flange 16 into biting gripping cover-retaining engagement with the elongated terminal flange 16 and specifically the relatively flat inside surface 17. The cover is bottomed on the wheel by urging the cover sufficiently axially rearwardly until junction 36 between leg portions 30 and 32 is in bottomed engagement against the radially extending rim flange 15.

The cover may be removed from the outer side of the wheel by inserting a suitable pry-off tool between the bead 26 and the terminal edge 35 and upon the application of a suitable pry-off force, the fingers or extension 30 may be disengaged from the tire rim 14.

The retaining action of the extensions is occasioned by virtue of the fact the edges 33 of the extensions are adapted to lie in a common circle having a diameter which is slightly larger than the inside diameter of the terminal rim flange 17.

It will be understood that modifications and variations may be effected without departing from the scope of the novel concepts of the present invention.

I claim as my invention:

1. In a wheel structure including a wheel having a tire rim including a radial rim flange, and an axially outwardly extending terminal rim flange which flanges are joined together and generally right angularly related, a cover structure overlying the wheel including a cover, said cover having a radially and axially inwardly inclined outer margin overlying to conceal the rim but spaced therefrom to facilitate cover removal and provided with circumferentially spaced cover openings for circulating air behind the cover at the radially inner side thereof, radially and axially inwardly inclined cover material only partially cut from the margin from at least some of said openings and being formed into a plurality of resiliently deflectable retaining extensions, each of said extensions emanating from and concealed by the inclined cover margin at the radially outer side of the cover opening, said extensions being disposed in a common circle and each having a relatively long axial leg and a return bent short stiff radially and axially outwardly extending leg terminating in a terminal edge for edgewise engagement with the terminal rim flange, said short stiff return bent legs extending diagonally between the rim flange having the terminal edges engaged under resilient tension with the terminal rim flange and with opposite ends of said return bent legs bottomed against the radial rim flange providing a rigid back-up for the engagement of the terminal edges against the terminal rim flange and to prevent distortion of the extensions upon the application of axially inward curbing forces and with said terminal legs and said extensions being otherwise spaced from the wheel.

2. In a wheel structure including a wheel having a tire rim including a radial rim flange, and an axially outwardly extending terminal rim flange which flanges are joined together and generally right angularly related, a cover structure overlying the wheel including a cover, said cover having radially and axially inclined outer margin overlying to conceal the rim but spaced therefrom to facilitate cover removal and provided with circumferentially spaced cover openings defined by edges for circulating air behind the cover at the radially inner side thereof, radially and axially inwardly inclined cover material only partially cut from the margin from at least some of said openings and being turned into a plurality of resiliently deflectable retaining extensions, each of said extensions emanating from and concealed by the inclined cover margin at the radially outer side of the cover opening, said extensions being disposed in a common circle and each having a relatively long axial leg and a return bent short stiff radially and axially outwardly extending leg terminating in a terminal edge for edgewise engagement with the terminal rim flange, said short stiff return bent legs extending diagonally between the rim flange having the terminal edges engaged under resilient tension with the terminal rim flange and with opposite ends of said return bent legs being adapted for bottomed engagement against the radial rim flange to provide a back-up for extensions to resist distortion of the extensions upon the application of axially inward curbing forces against the cover, and said cover having its outer edge beaded and with the edge of said openings underturned on radially opposite sides of said extensions in close adjacency thereto to rigidify the cover margin at the junction of the extensions with the cover margin.

References Cited in the file of this patent

UNITED STATES PATENTS

| 2,160,272 | Franz | May 30, 1939 |
| 2,198,056 | Lyon | Apr. 23, 1940 |
| 2,690,357 | Lyon | Sept. 28, 1954 |